| United States Patent [19] | [11] Patent Number: 4,800,098 |
| Galland | [45] Date of Patent: Jan. 24, 1989 |

[54] METHOD OF PRESERVING POTATOES

[75] Inventor: Sherry A. Galland, Caldwell, Id.

[73] Assignee: J. R. Simplot, Boise, Id.

[21] Appl. No.: 652,109

[22] Filed: Sep. 19, 1984

[51] Int. Cl.$^4$ .............................................. A23L 1/216
[52] U.S. Cl. .................... 426/637; 426/102; 426/327; 426/438
[58] Field of Search ............... 426/615, 637, 89, 102, 426/302, 321, 327, 438

[56] References Cited

U.S. PATENT DOCUMENTS

| 3,057,732 | 10/1962 | Conrad et al. | |
| 4,256,777 | 3/1981 | Weaver et al. | 426/637 |
| 4,551,340 | 11/1985 | El- Hag et al. | 426/438 |
| 4,590,080 | 5/1986 | Penegar | 426/637 |
| 4,626,438 | 12/1986 | Glantz | 426/481 |

FOREIGN PATENT DOCUMENTS 1597550  9/1981  United Kingdom .

OTHER PUBLICATIONS

Advertising literature (1 page) of Ida-glo of Idaho, Inc. for Ida-glo I.Q.F. Mini Baked Idaho Potatoes.
Prestige American Advertising Literature, Cincinnati, Ohio Great American Basic Commodities, Inc. advertising literature.
Columbia Sun Frozen Bakers Advertising Literature.
Family Circle 1972, pp. 2005, 2006, 2008, Rockville House Publishers, Inc., Rockville Center, N.Y.

*Primary Examiner*—Donald E. Czaja
*Assistant Examiner*—Carolyn Paden
*Attorney, Agent, or Firm*—Kelly, Bauersfeld & Lowry

[57] · ABSTRACT

This invention is directed to improved process for treating whole unpeeled potatoes and other root stock vegetables prior to the freezing thereof so that when the frozen potatoes are reconstituted by heating they have the appearance, texture and taste closely matching those of such vegetables which have been baked in a conventional fashion. The improved process comprises heating the vegetables at a temperature from about 200 to 300° F. for a period of from 2 to 40 minutes with an edible oil on the surface thereof. This step may be followed by a second treatment at a temperature of about 185° F. to 220° F. The potatoe may then be frozen at a temperature of about $-30°$ to $-60°$ F. and stored at freezing temperatures for long periods without any detrimental effects on the taste, texture or appearance of the potato when it is reconstituted by heating.

7 Claims, No Drawings

METHOD OF PRESERVING POTATOES

BACKGROUND OF THE INVENTION

This invention generally relates to the process for preparing frozen, unpeeled whole baked potatoes and other root stock vegetables (hereinafter potatoes). Prior efforts of freezing previously cooked unpeeled potatoes have failed to produce a product which when reconstituted by heating to serving temperatures, closely resembled in taste, texture and appearance the fresh vegetable which had been baked in a conventional fashion. Heretofore, such prior processes provided potatoes which when reconstituted had skin that was either cracked, flaky or discolored, or meat that was mushy or had a poor taste.

Most of the prior methods of preserving cooked, unpeeled potatoes involve freezing and much of the work in this area has been directed to pretreatment methods of cooking or blanching the potato prior to freezing. For example, potatoes have been baked, boiled and steamed in various combinations and at various times and temperatures. However, notwithstanding such various pre-treatment methods, the results were always less than satisfactory.

The interest in developing pre-cooked potatoes which can be readily reconstituted by heating, such as in a microwave oven or other quick heating means, is two-fold. First, there is interest in reducing the time and labor of preparing baked potatoes in a conventional fashion where each potato must be hand-oiled, wrapped in foil and baked for about an hour at a temperature of about 425° F. Additionally, the quality of potatoes varies considerably throughout the year, and it would be very desirable to preserve the high quality potatoes which are available only during certain times of the year so that they would be available throughout the year. Both aspects are of particular interest on the commercial level, such as in restaurants and the like. Moreover, with growing consumer acceptance of high quality foods which can be fixed quickly, such as in a microwave oven, the interest could be even greater.

None of the available processes have been found suitable to provide a frozen baked potato which when quickly reconstituted by heating had properties which closely matches those of conventionally baked fresh potatoes. The present invention provides such a process.

SUMMARY OF THE INVENTION

The present invention is primarily directed to a new process for preparing unpeeled potatoes for freezing and the freezing thereof to facilitate the long term storage thereof in the frozen condition.

In accordance with the present invention potatoes are initially treated at temperatures between about 200° and 300° F., preferably about 210° to 275° F., for a period varying from about 2 to 40 minutes with the surfaces thereof having a continuous and substantial coat of an edible oil such as animal and vegetable oils. After such treatment, the potatoes may be subsequently treated at elevated temperatures in air or in an aqueous media such as water or steam.

Following the above processing, the potatoes are quickly frozen at a temperature preferably between about −30° F. and −60° F. and may be stored for extended periods at freezing temperatures with essentially no detrimental effects on the reconstituted characteristics of the potatoes.

When the frozen potatoes so treated are subsequently reconstituted by quickly heating to a serving temperature of about 160° to 210° F., the appearance of the potato skin and the texture and taste of the meat thereof closely resemble that of conventionally baked fresh potatoes.

These and other advantages will become more apparent in the following more detailed description of the invention.

DETAILED DESCRIPTION OF A PREFERRED EMBODIMENT

This invention is directed to a process for preparing whole, unpeeled potatoes for freezing, so that, upon subsequent reconstitution thereof by quickly heating to serving temperatures, the appearance, texture and taste of the vegetable closely resembles the appearance, texture and taste of a fresh vegetable which has been baked in a conventional fashion.

In accordance with this invention, an unpeeled potato is first cooked or blanched with a substantial and continuous coating of edible oil on essentially the entire surface thereof at a temperature between about 200° and 300° F., preferably from about 210°–275° F., for a period of time from about 2 to 40 minutes. The period at temperature depends upon the size of the potatoes, the extent of any previous thermal treatments given to the potatoes and the nature of any subsequent treatments which will be given to the potatoes. Preferably, the potatoes are submerged in a bath of edible oil at the prescribed temperatures.

Blanching the potatoes in oil at temperatures much above 275° F. for extended periods causes the flavor of the reconstituted potato to deteriorate, and at blanching temperatures above 300° F., the flavor of the reconstituted potato becomes unacceptable. At temperatures below 200° F. the process becomes excessively long.

A wide variety of edible oils, both animal and vegetable, can be used in the oil blanch process. Suitable oils include soy bean oil, cotton seed oil, beef fat and mixtures of such oils. The process does not add any measurable increase in the fat content of the potatoes and it does not appear to change the moisture content thereof. The rheological properties of the oil are not particularly critical so long as the oil is not extremely viscous at the operating temperatures.

The primary oil treatment may be followed by an optional thermal treatment in air, steam or hot water in order to reduce the time of the oil blanching. The treatment times and temperature for the optional second heating step depend to a considerable extent upon the size of the potatoes and the manner of thermal treatment. For example, when heating by microwave, a treatment for 3–5 minutes is adequate, whereas, when heating in air at 300°–400° F., a suitable treatment may take 15 to 30 minutes. Steam or water treatment range from 10 to 30 minutes at temperatures between 180° and 220° F.

The thus treated potato is then frozen at a temperature between about −60° F. and −30° F., preferably at about −40° F., in a conventional fashion and may be stored over long periods of time at freezing temperatures under about 0° F. without any significant deterioration in the appearance of the potato and the taste and texture of the meat of the potatoes when reconstituted by heating. The initial freezing of the potatoes should be conducted over a period greater than 10 minutes to avoid cracking the skin.

Prior to the above treatments, the potatoes are cleaned and then put into lots of more or less equal potato size so that all of the potatoes of a particular lot can be cooked or blanched to essentially the same condition.

In a preferred embodiment, unpeeled potatoes are cooked or blanched in large cooking vessels containing an edible oil such as corn oil at the requisite temperature by submerging the potatoes into the oil bath for the requisite time. The potatoes are removed from oil bath in the vessels after such treatment and drained to remove excess surface oil. The oil blanched potatoes are then placed in a chamber for treatment with steam in order to further cook the potatoes.

Following the steam cooking, the potatoes are cooled, held until any free moisture on the surface of the potatoes has evaporated and then placed in a freezing chamber for the deep freezing thereof. The potatoes should be brought to the freezing temperature in not less than about 10 minutes to avoid any cracking of the skin.

Although the above processing has been found to be a preferred method of providing the desired products, other practices can also be employed to obtain the same or similar results. As long as the entire surfae of the potato has a substantial and continuous coat of an edible oil during the thermal treatment improvements can be obtained. Continuous processes can also be used. Additionally, dry thermal treatments may precede the oil blanch process.

The individual treated potatoes need not be wrapped with a protective covering prior to freezing, but care should be exercised during the freezing and long term storage in the frozen condition to ensure that the potatoes do not become stuck or frozen together because, if they do, when they are pulled apart or transported in some manner, parts of the skin can be pulled off or away from the body of the potato.

The frozen baked potatoes can be reconstituted by heating them in the frozen state or they can first be thawed, then heated. Any conventional method of heating can be utilized including convection heating in air, i.e., as in a convection oven or by microwave radiation. It is preferred to heat the potatoes to a serving temperature between about 160° and 210° F. although the potatoes can be heated to much higher temperatures and then allowed to cool. The time for heating to reconstitute the potatoes ranges from about 2 to 6 minutes for microwave radiation and about 7 to 30 minutes for convection and steam heating.

The following are examples of various embodiments of the invention. In these examples several cleaned Russet potatoes of essentially the same size, i.e., 4–5 oz., were treated in the manner indicated in laboratory sized equipment. Cleaned potatoes were first submerged into an oil bath at the temperature and for the times indicated and then were given the subsequent thermal treatments indicated.

| Example No. | Process | Temp °F. | Time (min) |
|---|---|---|---|
| 1 | Oil Blanch | 250 | 10 |
|   | Steam Cook | 212 | 15 |
| 2 | Oil Blanch | 250 | 24 |
| 3 | Oil Blanch | 250 | 5 |
|   | Microwave Heat | (650 watts) | 4 |
| 4 | Oil Blanch | 250 | 5 |
|   | Air Bake | 350 | 15 |

The potatoes in the above examples were then frozen by subjecting them to a temperature of about −40° F. for 20 minutes, stored for a short period at a freezing temperature less than about 0° F. and then heated to a serving temperature about 180° F. by microwave heating. All of the tested potatoes exhibited excellent taste and mealy texture which closely matched the taste and texture of conventionally cooked fresh baked potatoes. Moreover, there were no cracks in the skins of the potatoes and there was no discoloration thereof.

The process of the invention produces frozen baked potatoes which have reconstituted properties very close to those of conventionally baked fresh potatoes. Moreover, the process makes the subsequent cooking of the frozen potatoes much easier and quicker than prior processes. The frozen and thawed potatoes processed in accordance with the invention have very durable skins which can not be easily scraped off as with other types of frozen baked potatoes.

Although specific embodiments of the invention have been described herein in detail, it is to be understood that this is for purposes of illustration and that other embodiments and modifications thereof can be made without departing from the inventive concepts thereof.

We claim:

1. A method of preparing frozen unpeeled whole potatoes for subsequent reheating for consumption, wherein the reheated potatoes have a taste and texture simulating whole unpeeled potatoes baked to completion from a raw state, said method comprising:
   a. cooking the potatoes at a temperature between about 200° and 300° F. for a period of about 2 to 40 minutes by immersing the potatoes within a heated bath of edible oil, thereby maintaining a substantial and continuous coating of the edible oil on the entire surface of the potatoes during the cooking thereof; and
   b. freezing the potatoes.

2. The method of claim 1 wherein the cooked potatoes are further cooked in an aqueous medium at a temperature between about 180° and 220° F. prior to freezing.

3. The method of claim 1 wherein the potatoes are further cooked prior to freezing at a temperature between about 210° and 275° F.

4. The method of claim 2 wherein the potatoes are further cooked prior to freezing in air at a temperature between about 300° and 400° F.

5. The method of claim 3 wherein the potatoes are further cooked prior to freezing by submerging them in a bath of edible vegetable oil maintained at a temperature between about 210° and 275° F.

6. The method of claim 1 further including the step of reconstituting the frozen potatoes for eating by heating the potatoes to a serving temperature between about 160° and 210° F.

7. The method of claim 1 wherein the freezing step comprises reducing the temperature of the potatoes to between −30° and −60° F. in a period of not less than 10 minutes.

* * * * *